(12) United States Patent
De Felice et al.

(10) Patent No.: US 12,617,418 B2
(45) Date of Patent: May 5, 2026

(54) SYSTEMS AND METHODS FOR DETECTING VEHICLE IDLING AND DETERMINING CLASSIFICATIONS FOR THE VEHICLE IDLING

(71) Applicant: Verizon Patent and Licensing Inc., Basking Ridge, NJ (US)

(72) Inventors: Francesco De Felice, Florence (IT); Filippo Valente, Sesto Fiorentino (IT); Giovanni Pini, Florence (IT); Tommaso Mugnai, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 233 days.

(21) Appl. No.: 18/463,991

(22) Filed: Sep. 8, 2023

(65) Prior Publication Data

US 2025/0083684 A1     Mar. 13, 2025

(51) Int. Cl.
| | |
|---|---|
| *B60W 50/14* | (2020.01) |
| *B60W 30/18* | (2012.01) |
| *B60W 40/04* | (2006.01) |
| *B60W 40/09* | (2012.01) |
| *G06V 10/764* | (2022.01) |
| *G06V 20/56* | (2022.01) |
| *G06V 20/59* | (2022.01) |

(52) U.S. Cl.
CPC ...... *B60W 50/14* (2013.01); *B60W 30/18054* (2013.01); *B60W 40/04* (2013.01); *B60W 40/09* (2013.01); *G06V 10/764* (2022.01); *G06V 20/56* (2022.01); *G06V 20/597* (2022.01); *B60W 2420/403* (2013.01); *B60W 2510/0642* (2013.01)

(58) Field of Classification Search
CPC .......... B60W 50/14; B60W 30/18054; B60W 40/04; B60W 40/09; B60W 2420/403; B60W 2510/0642; G06V 10/764; G06V 20/56; G06V 20/597
See application file for complete search history.

(56) References Cited

U.S. PATENT DOCUMENTS

| | | | | |
|---|---|---|---|---|
| 11,812,388 B2 * | 11/2023 | Lekutai | ............. | H04W 52/0258 |
| 12,351,176 B2 * | 7/2025 | Salako | ............ | B60W 30/18054 |
| 2012/0299556 A1 * | 11/2012 | Ishikawa | ................. | B60L 50/50 320/162 |
| 2020/0226856 A1 * | 7/2020 | Zamora Esquivel | ........................ | G06N 3/0464 |
| 2021/0181740 A1 * | 6/2021 | Zhu | ................. | B60W 30/18027 |

(Continued)

*Primary Examiner* — Thomas E Worden
*Assistant Examiner* — Madison B Emmett

(57) ABSTRACT

A device may receive road facing camera (RFC) video data, driver facing camera (DFC) video data, and idling events data associated with a vehicle, and may receive traffic data associated with the vehicle. The device may determine that an idling event of the idling events data is an idling event trigger, and may process the idling event and the DFC video data, based on the idling event being an idling event trigger and with a first machine learning model, to determine a behavior of a driver of the vehicle. The device may process the behavior of the driver, the RFC video data, and the traffic data, with a second machine learning model, to determine a score for the idling event, and may determine a classification for the idling event based on the score and a score threshold. The device may perform one or more actions based on the classification.

20 Claims, 12 Drawing Sheets

100 ⟶

(56)                    References Cited

U.S. PATENT DOCUMENTS

| | | | |
|---|---|---|---|
| 2022/0136474 A1* | 5/2022 | Ostrowski | G06N 3/08 |
| | | | 123/179.4 |
| 2023/0144745 A1* | 5/2023 | Ulutan | G05D 1/0246 |
| | | | 382/104 |
| 2024/0054896 A1* | 2/2024 | Fan | G06Q 10/08355 |
| 2024/0199021 A1* | 6/2024 | Salako | B60W 40/105 |

* cited by examiner

120
Determine whether an idling event of the idling events data is an idling event trigger Video system
105

115
Receive traffic data associated with the vehicle

110
Receive road facing camera (RFC) video data, driver facing camera (DFC) video data, and idling events data associated with a vehicle Data structure

100

135
Process the idling event, the RFC video data, and the traffic data, based on the idling event being an idling event trigger and with a second machine learning model, to determine a second score for the idling event

140
Determine a second classification for the idling event based on the second score and a second score threshold

145
Process the idling event and the DFC video data, based on the idling event being an idling event trigger and with a third machine learning model, to determine a behavior of a driver of the vehicle Behavior Third machine learning model Video system 105

DFC video data

Idling event trigger

100

100

Generate a notification based on the first classification, the second classification, or the third classification and provide the notification to the vehicle Determine a rating for the driver based on the first classification, the second classification, or the third classification Schedule the driver for training based on the first classification, the second classification, or the third classification Cause the vehicle to be disabled based on the first classification, the second classification, or the third classification Retrain the first, second, and/or third machine learning models based on the first classification, the second classification, or the third classification

160
Perform one or more actions based on one of the first classification, the second classification, or the third classification

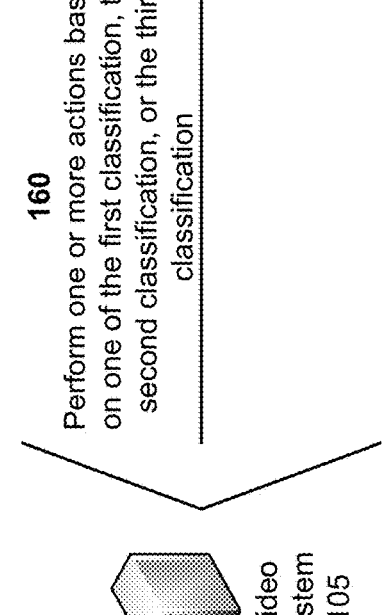

Video system
105

FIG. 1F

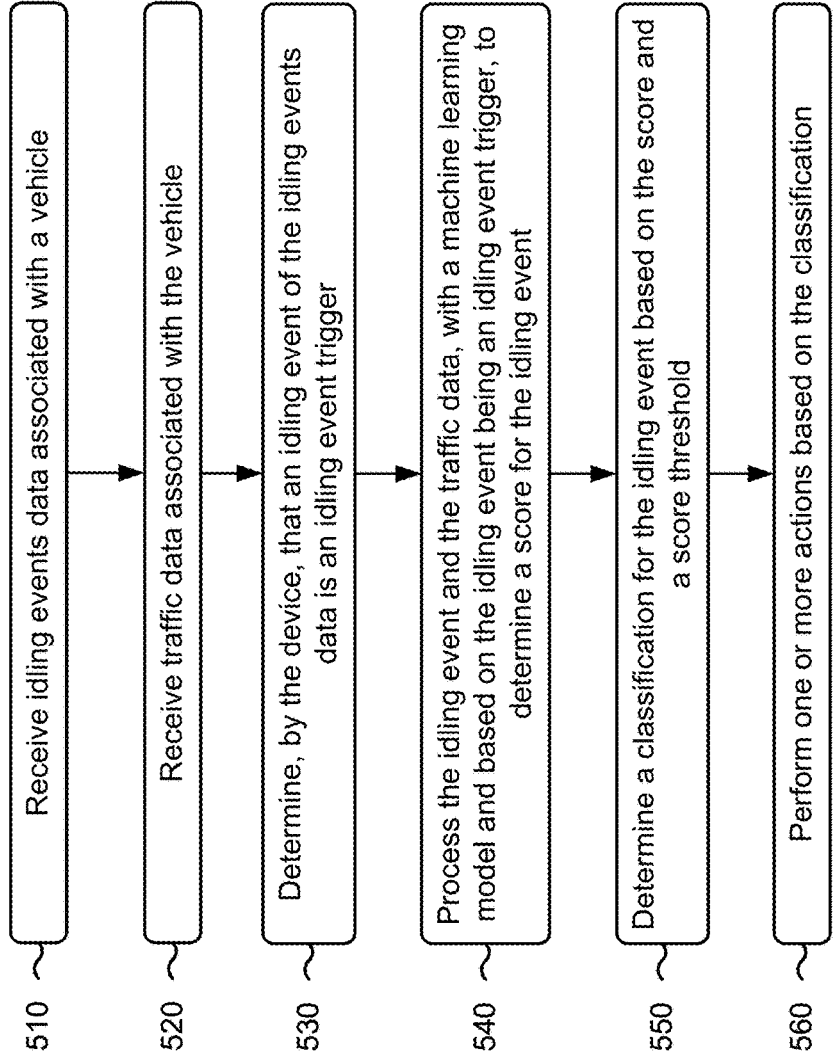

510 — Receive idling events data associated with a vehicle

520 — Receive traffic data associated with the vehicle

530 — Determine, by the device, that an idling event of the idling events data is an idling event trigger 540 — Process the idling event and the traffic data, with a machine learning model and based on the idling event being an idling event trigger, to determine a score for the idling event 550 — Determine a classification for the idling event based on the score and a score threshold 560 — Perform one or more actions based on the classification

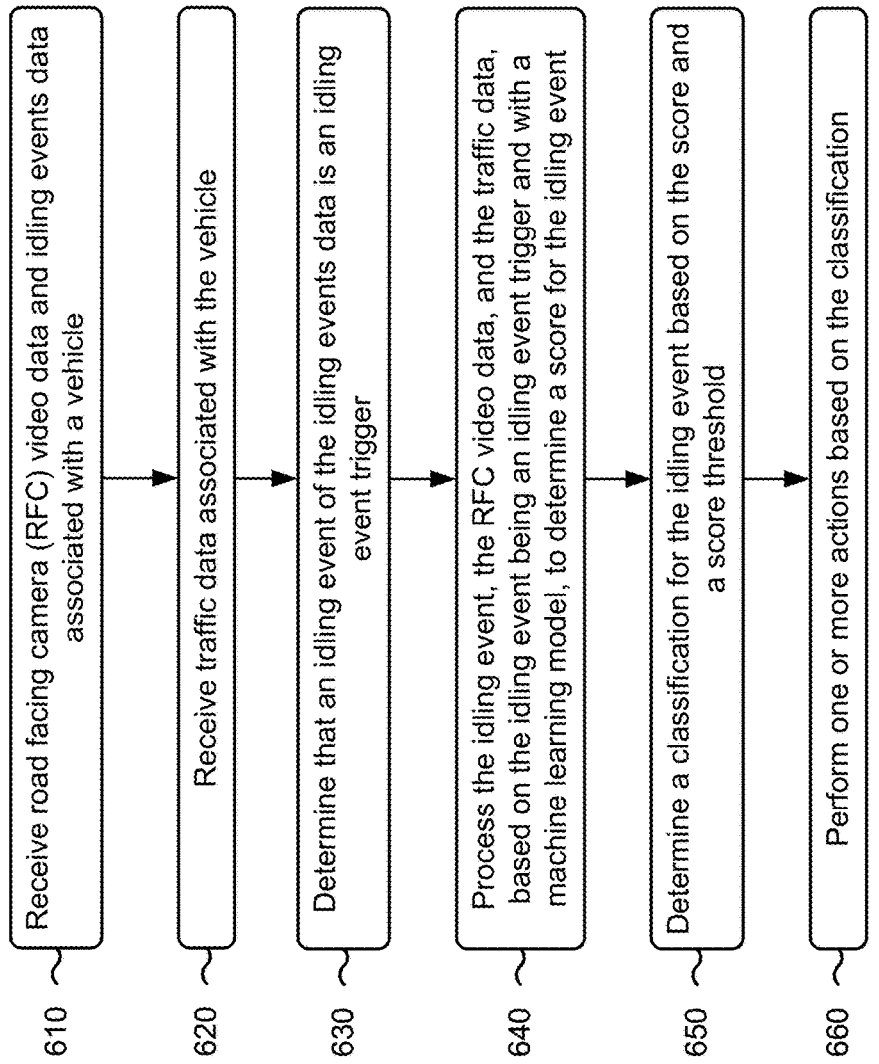

600

610 — Receive road facing camera (RFC) video data and idling events data associated with a vehicle 620 — Receive traffic data associated with the vehicle 630 — Determine that an idling event of the idling events data is an idling event trigger 640 — Process the idling event, the RFC video data, and the traffic data, based on the idling event being an idling event trigger and with a machine learning model, to determine a score for the idling event 650 — Determine a classification for the idling event based on the score and a score threshold 660 — Perform one or more actions based on the classification

FIG. 6

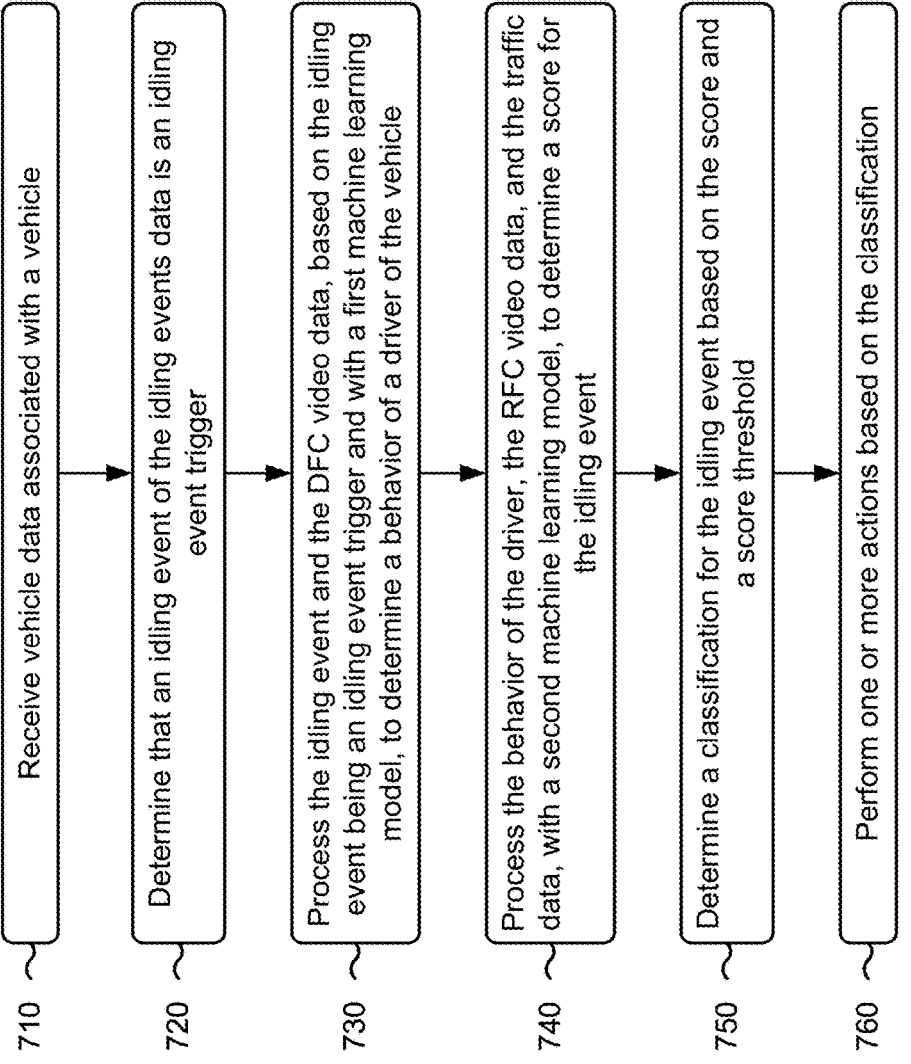

700

710 Receive vehicle data associated with a vehicle

720 Determine that an idling event of the idling events data is an idling event trigger 730 Process the idling event and the DFC video data, based on the idling event being an idling event trigger and with a first machine learning model, to determine a behavior of a driver of the vehicle 740 Process the behavior of the driver, the RFC video data, and the traffic data, with a second machine learning model, to determine a score for the idling event 750 Determine a classification for the idling event based on the score and a score threshold 760 Perform one or more actions based on the classification

FIG. 7

SYSTEMS AND METHODS FOR DETECTING VEHICLE IDLING AND DETERMINING CLASSIFICATIONS FOR THE VEHICLE IDLING

BACKGROUND

With today's modern automobile engines, no more than thirty seconds of idling is needed on winter days before driving the vehicle. Nevertheless, it is common practice to run a vehicle for several minutes in order to warm up the vehicle. However, idling only warms the vehicle's engine, but fails to warm wheel bearings, steering, suspension, transmission, and tires of the vehicle. These parts also need to be warmed up, and the only way to do that is to drive the vehicle.

BRIEF DESCRIPTION OF THE DRAWINGS

FIGS. 1A-1F are diagrams of an example associated with detecting vehicle idling and determining classifications for the vehicle idling.

FIGS. 5-7 are flowcharts of example processes for detecting vehicle idling and determining classifications for the vehicle idling.

DETAILED DESCRIPTION OF EXAMPLE EMBODIMENTS

Figure 1A:
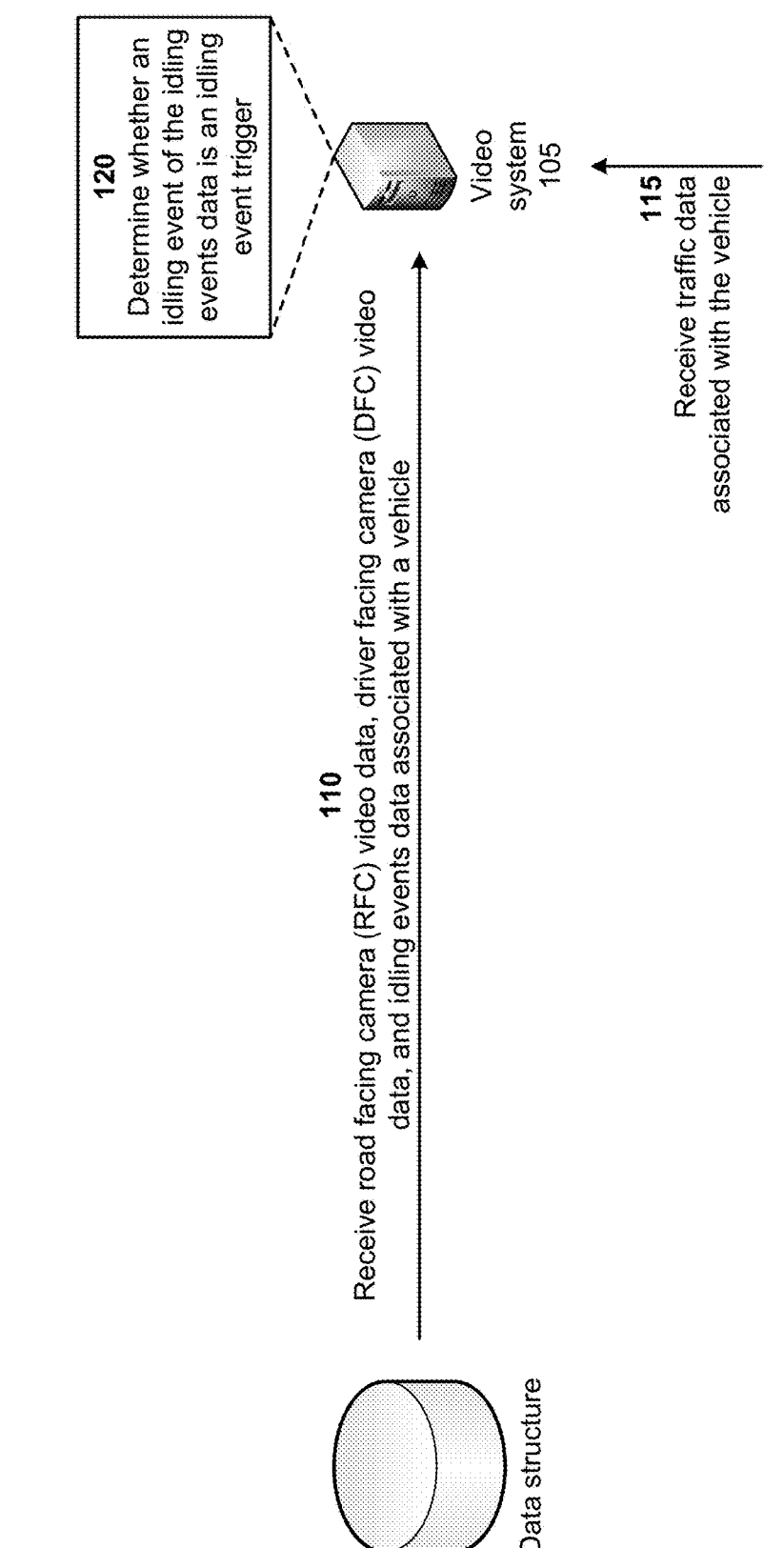

The following detailed description of example implementations refers to the accompanying drawings. The same reference numbers in different drawings may identify the same or similar elements.

Although some vehicles may need to idle, vehicle idling creates environmental and health issues by increasing the amount of vehicle exhaust in the air. Vehicle exhaust contains many pollutants that are linked to asthma and other lung diseases, allergies, heart disease, increased risk of infections and cancer, and other health problems. Air pollution is one of the top causes for climate change and all its catastrophic consequences. Higher levels of air pollution have been linked to increased school absences, hospital visits, and even premature deaths. Vehicle emissions are still present and harmful even when you cannot see the exhaust. Vehicle idling also creates cost issues and vehicle damage. For each hour spent idling, a typical light duty truck wastes approximately one gallon of diesel fuel and a typical car wastes 0.2 gallons of gasoline. Vehicle idling can damage the vehicle's transmission or overheat the vehicle's engine. The problems associated with vehicle idling are further exasperated with a fleet of vehicles since a fleet may include thousands, tens of thousands, hundreds of thousands, and/or the like of vehicles associated with vehicle idling.

Thus, current techniques for operating a vehicle and/or managing a fleet of vehicles consume computing resources (e.g., processing resources, memory resources, communication resources, and/or the like), networking resources, and/or other resources associated with creating unnecessary air pollution with vehicle idling, creating health issues with the unnecessary air pollution, increasing operating costs associated with the vehicle or the fleet of vehicles, causing damage to the vehicle or the fleet of vehicles, and/or the like.

Some implementations described herein relate to a video system that detects vehicle idling and determines classifications for the vehicle idling. For example, the video system may receive road facing camera (RFC) video data, driver facing camera (DFC) video data, and idling events data associated with a vehicle, and may receive traffic data associated with the vehicle. The video system may determine that an idling event of the idling events data is an idling event trigger, and may process the idling event and the DFC video data, based on the idling event being an idling event trigger and with a first model (e.g., a machine learning model), to classify a behavior of a driver of the vehicle. The video system may process the behavior of the driver, the RFC video data, and the traffic data, with a second machine learning model, to determine a score for the idling event, and may determine a classification for the idling event based on the score and a score threshold. The video system may perform one or more actions based on the classification.

In this way, the video system detects vehicle idling and determines classifications for the vehicle idling. For example, the video system may identify and classify vehicle idling events utilizing, e.g., a set of machine learning models based on available data. The video system may utilize the identification and classification of the vehicle idling events to score fleets on idling behavior, alert drivers of unnecessary vehicle idling, to provide training to drivers associated with idling, and/or the like. The video system may utilize a first or basic machine learning model that identifies and classifies vehicle idling events based on vehicle tracking unit (VTU) data. The video system may utilize a second or enhanced machine learning model that identifies and classifies vehicle idling events based on VTU data and RFC video data. The video system may utilize a third or ultimate machine learning model that identifies and classifies vehicle idling events based on VTU data, RFC video data, and DFC video data. Thus, the video system may conserve computing resources, networking resources, and/or other resources that would have otherwise been consumed by creating unnecessary air pollution with vehicle idling, creating health issues with the unnecessary air pollution, increasing operating costs associated with the vehicle or the fleet of vehicles, causing damage to the vehicle or the fleet of vehicles, and/or the like.

FIGS. 1A-1F are diagrams of an example 100 associated with detecting vehicle idling and determining classifications for the vehicle idling. As shown in FIGS. 1A-1F, example 100 includes a video system 105 associated with a data structure. The video system 105 may include a system that detects vehicle idling and determines classifications for the vehicle idling. The data structure may include a database, a table, a list, and/or the like. Further details of the video system 105 and the data structure are provided elsewhere herein.

As shown in FIG. 1A, and by reference number 110, the video system 105 may receive RFC video data, DFC video data, and idling events data associated with a vehicle. For example, dashcams or other video devices of vehicles may record video data (e.g., video footage) of events associated with the vehicles. The video data may be recorded based on a trigger associated with the events and may include RFC video data received from RFCs of the vehicles and DFC video data received from DFCs of the vehicles. For example, a harsh event may be detected by an accelerometer mounted inside a vehicle (e.g., a kinematics trigger). Alternatively, a processing device of a vehicle may include a machine learning model that detects a potential danger for the vehicle and requests further processing to obtain the video data. Alternatively, a driver of a vehicle may cause the RFC video data and/or the DFC video data to be captured at a moment at which the event occurs. The vehicles or the video devices may transfer the RFC video data and the DFC video data to a data structure (e.g., a database, a table, a list, and/or the like). The vehicles may also include sensors, such as global positioning system (GPS) sensors, inertial measurement unit (IMU) sensors, and/or the like that may be utilized to determine whether the vehicles are idling (e.g., with engines running but not moving) and generating idling events data. In some implementations, the idling events data associated with the vehicles may be generated by vehicle tracking systems of the vehicles. The vehicles may provide the idling events data captured by the vehicle tracking systems to the data structure.

The vehicles may repeatedly transfer the RFC video data, the DFC video data, and the idling events data to the data structure over time so that the data structure may store the RFC video data, the DFC video data, and the idling events data. In some implementations, the video system 105 may continuously or periodically receive the RFC video data, the DFC video data, and the idling events data from the data structure, may receive the RFC video data, the DFC video data, and the idling events data from the data structure based on requesting the RFC video data, the DFC video data, and the idling events data from the data structure, and/or the like.

As further shown in FIG. 1A, and by reference number 115, the video system 105 may receive traffic data associated with the vehicle. For example, the video system 105 may receive the traffic data associated with the vehicle from a service that provides traffic data associated with a current location of the vehicle. The traffic data may include data identifying roadways associated with the current location of the vehicle, travel speeds on the roadways, traffic signs associated with the current location of the vehicle, traffic signals associated with the current location of the vehicle, and/or the like. In some implementations, the video system 105 may continuously or periodically receive the traffic data from the service, may receive the traffic data from the service based on requesting the traffic data from the service, and/or the like. In some implementations, the traffic data may be stored in the data structure, and the video system 105 may receive the traffic data from the data structure.

As further shown in FIG. 1A, and by reference number 120, the video system 105 may determine whether an idling event of the idling events data is an idling event trigger. For example, not every idling event associated with the vehicle may be associated with an idling event trigger. Thus, the video system 105 may determine whether an idling event of the idling events data is an idling event trigger. In some implementations, the video system 105 may determine that the idling event of the idling events data is an idling event trigger when then the idling event satisfies a threshold value (e.g., a duration threshold). The idling event trigger may be generated by a vehicle tracking system of the vehicle or a system where the idling events data is stored (e.g., the data structure, a server device, and/or the like). In some implementations, the threshold value may be set to a particular number (e.g., sixty seconds, seventy-five seconds, and/or the like), after an idling event analysis based on different factors, such as an idling duration distribution, an average duration of a red traffic light, and/or the like (e.g., an average time spent waiting for a red light is seventy-five seconds). The video system 105 may determine that the idling event fails to satisfy the threshold value and is not an idling event trigger. When the idling event fails to satisfy the threshold value, the video system 105 may not take any action with respect to the idling event of the vehicle.

In some implementations, the threshold value may be set to any value, or customers may set the threshold values via the video system 105 since different customers work in different areas and with different vehicles, so allowed idling times may vary. For example, a company that owns small vehicles, with start and stop systems, may set the threshold value for idling very low since it is possible to easily turn a vehicle off and on without any impact on work. Another company that owns work machinery (e.g., excavators, steamrollers, refrigerated vehicles, and/or the like) may not provide a threshold value since idling for such vehicles is not relevant (e.g., unless machinery is left running for an extended period time, which could lead to overheating and damage). Still another company that owns vehicles operating in a hot or cold area may be more tolerant of idling since air-conditioning or heating systems of the vehicles are crucial for drivers' health. In some implementations, the threshold value may differ for vehicles of the same company based on a single vehicle's specifications (e.g., the vehicle is a car, a truck, or a refrigerator truck) or based on a current location (e.g. a cold area, a hot area, and/or the like).

Figure 1B:
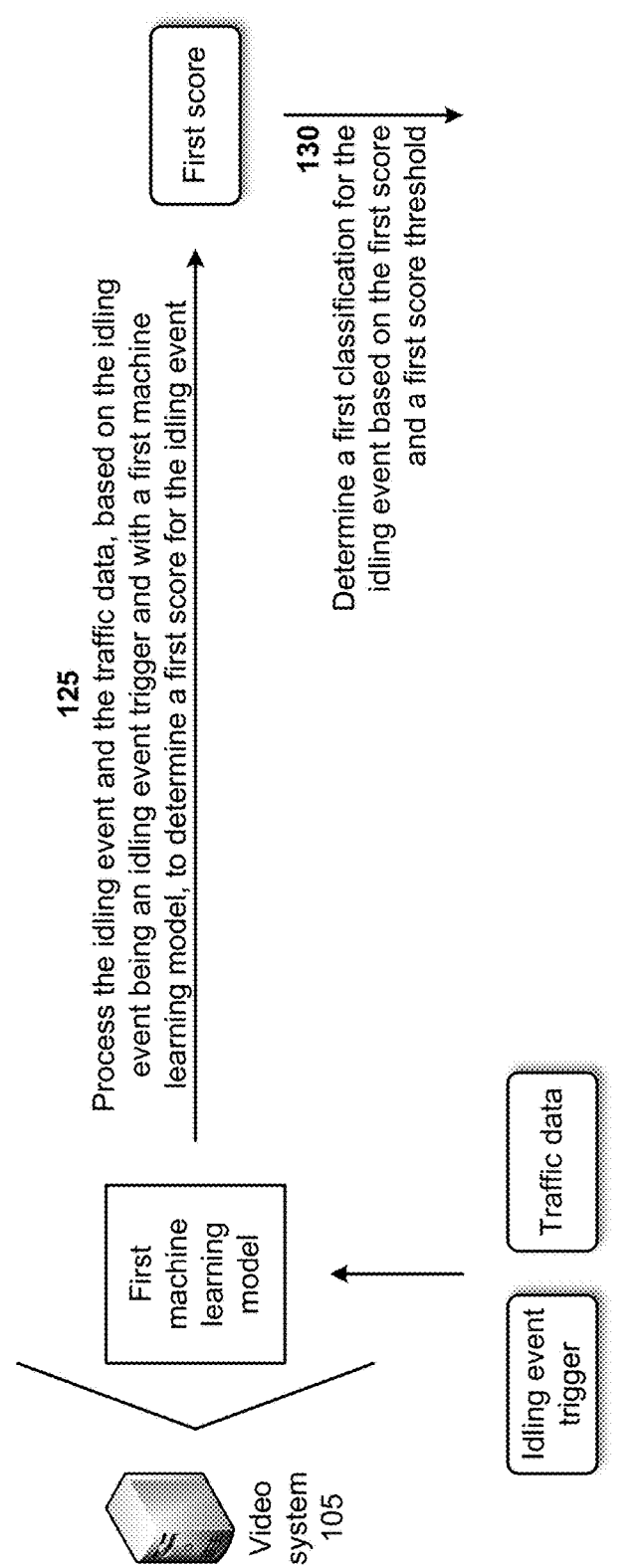

As shown in FIG. 1B, and by reference number 125, the video system 105 may process the idling event and the traffic data, based on the idling event being an idling event trigger and with a first machine learning model, to determine a first score for the idling event. For example, when the video system 105 determines that the idling event is an idling event trigger, the video system 105 may process the idling event and the traffic data, with the first machine learning model, to determine a first score for the idling event. In some implementations, the first machine learning model may receive a duration and a geolocation of the idling event and the traffic data associated with the geolocation. The first machine learning model may utilize the duration and the geolocation of the idling event and the traffic data associated with the geolocation to determine whether the vehicle is idling in the middle of traffic or at a street junction. If the vehicle is idling in the middle of traffic, the first machine learning model may determine the idling event to be tolerable. If there is no traffic, the vehicle may be stopped somewhere with the engine on and the first machine learning model may classify the idling event as an unacceptable idling event, or assign the event a particular score in a range.

In some implementations, the first machine learning model may determine the first score for the idling event based on processing the idling event and the traffic data. In one example, the first machine learning model may calculate the first score (Se) for the idling event (e) as follows:

$$S_e = \tau * \sigma * \log_2\left(d_e - \frac{3}{4} * \delta\right) * \prod_{i=0}^{N} c_i,$$

where $d_e$ is a duration of the idling event, $\sigma$ is a parameter that normalizes a value for a percentage score, $\delta$ is the threshold value, $\tau$ is a traffic light and/or traffic detector value (e.g., less than one if traffic or traffic lights are detected, one otherwise), $c_i$ is a coefficient that may influence the first score (e.g., a vehicle type, presence of start and stop system, a temperature outside the vehicle, and/or the like), and N is a value of the coefficient $c_i$. The coefficient $c_i$ may be a value between zero and one if it decreases the probability of bad idling (e.g., a refrigerator truck or bad weather) or greater than one if it increases the probability of bad idling (e.g., start and stop system or good weather). In some implementations, the first score may include a value between 0% and 100%. If the first score is above 100% or below 0%, the video system 105 may consider the first score to be incorrect as not meaningful. In some implementations, the first score may be based on a sigmoid centered on the threshold value, instead of a log.

As further shown in FIG. 1B, and by reference number 130, the video system 105 may determine a first classification for the idling event based on the first score and a first score threshold. For example, the video system 105 may determine whether the first score satisfies the first score threshold, and may determine the first classification for the idling event based on whether the first score satisfies the first score threshold. In some implementations, the first classification may indicate a "good" or "acceptable" idling event when the first score fails to satisfy the first score threshold. Alternatively, the first classification may indicate a "bad" or "unacceptable" idling event when the first score satisfies the first score threshold. In some implementations, the video system 105 may utilize the traffic data to weight the first classification (e.g., if there is traffic, the idling event may be less severe) instead of providing a deterministic first classification (e.g., acceptable or unacceptable). The first score may represent, by construction, not only a probability that the idling event is bad, but also a measure of badness for the idling event. The video system 105 may aggregate the first score of each idling event in different ways to monitor a historical trend of vehicle behavior (e.g., which may provide useful coaching information to correct bad behaviors and implement improvements).

Figure 1C:
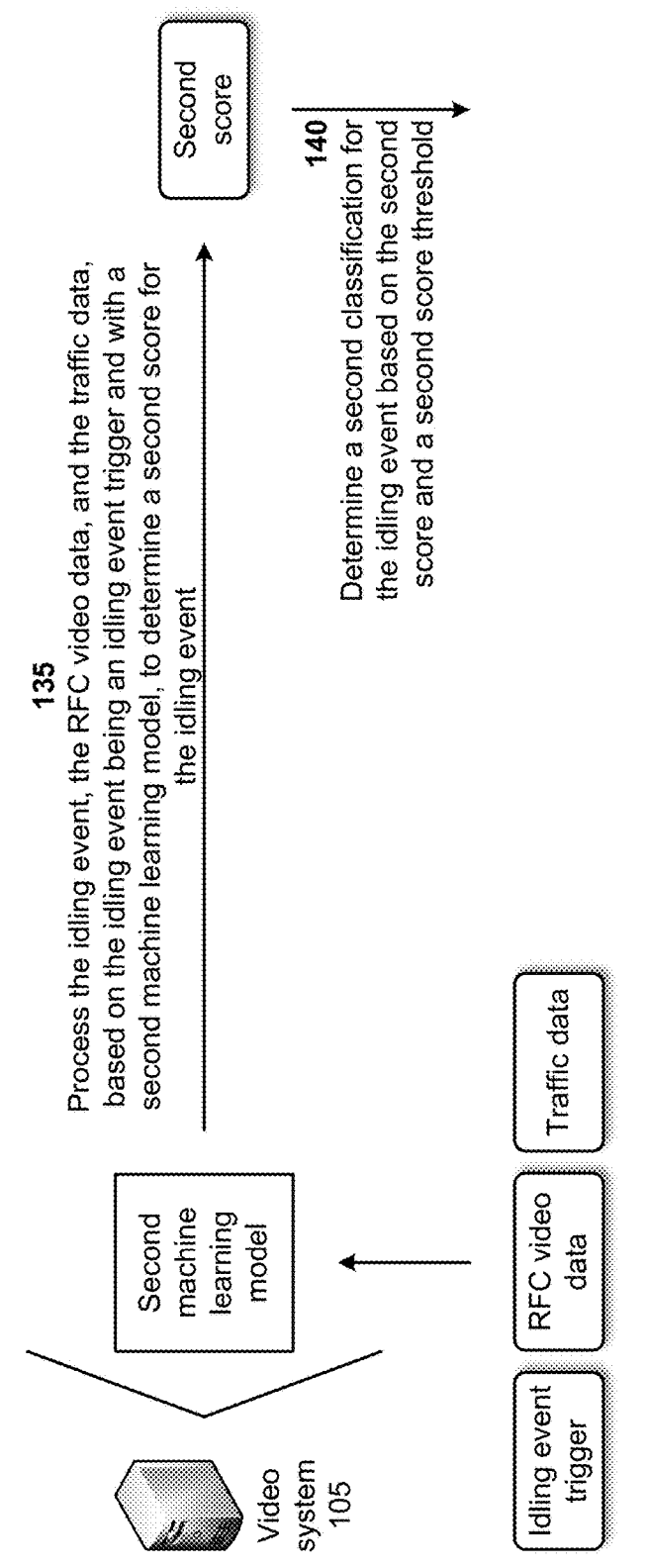

As shown in FIG. 1C, and by reference number 135, the video system 105 may process the idling event, the RFC video data, and the traffic data, based on the idling event being an idling event trigger and with a second machine learning model, to determine a second score for the idling event. For example, when the video system 105 determines that the idling event of the idling events data is an idling event trigger and the RFC video data is available, the video system 105 may process the idling event, the RFC video data, and the traffic data, with the second machine learning model, to determine a second score for the idling event. The RFC video data may improve calculation of the second score by the video system 105 since the RFC video data provides video at the location of the vehicle. The video system 105 may utilize the RFC video data (e.g., more robust but requiring more storage and compute power) or may utilize frames of the RFC video data (e.g., a lightweight solution). In some implementations, the second machine learning model may utilize the RFC video data to identify traffic lights or traffic associated with the current location of the vehicle based on presence of vehicles ahead the vehicle and movement of the vehicle (e.g., the vehicle movement may be identified from the RFC video data and/or vehicle telematics). In some implementations, the second score may be similar to the first score, but may be more precise due to an additional source of information (e.g., the RFC video data).

Since the RFC video data provides improved traffic detection, the video system 105 may relax the threshold value and may utilize the RFC video data to review the idling event and to flag only true bad idling events. For example, the video system 105 may relax the threshold value from seventy-five seconds to thirty seconds. In some implementations, the second machine learning model may determine the second score for the idling event based on processing the idling event, the RFC video data, and the traffic data. In one example, the second machine learning model may calculate the second score (Se) for the idling event (e) as follows:

$$S_e = \Gamma * \sigma * \log_2\left(d_e - \frac{3}{4} * \delta\right) * \prod_{i=0}^{N} c_i,$$

where $d_e$ is a duration of the idling event, $\sigma$ is a parameter that normalizes a value for a percentage score, $\delta$ is the threshold value, $\Gamma$ is an improved traffic light and/or traffic detector value (e.g., less than one if traffic is detected, one otherwise), and $c_i$ is a coefficient that may influence the second score (e.g., a vehicle type, presence of start and stop system, a temperature outside the vehicle, and/or the like). The coefficient $c_i$ may be a value between zero and one if it decreases the probability of bad idling (e.g., a refrigerator truck or bad weather) or greater than one if it increases the probability of bad idling (e.g., start and stop system or good weather). In some implementations, the second score may include a value between 0% and 100%.

As further shown in FIG. 1C, and by reference number 140, the video system 105 may determine a second classification for the idling event based on the second score and a second score threshold. For example, the video system 105 may determine whether the second score satisfies the second score threshold, and may determine the second classification for the idling event based on whether the second score satisfies the second score threshold. In some implementations, the second classification may indicate a "good" or "acceptable" idling event when the second score fails to satisfy the second score threshold. Alternatively, the second classification may indicate a "bad" or "unacceptable" idling event when the second score satisfies the second score threshold. In some implementations, the video system 105 may utilize the traffic data to weight the second classification (e.g., if there is traffic, the idling event may be less severe) instead of providing a deterministic second classification (e.g., acceptable or unacceptable). The second score may represent, by construction, not only a probability that the idling event is bad, but also a measure of badness for the idling event. The video system 105 may aggregate the second score of each idling event in different ways to monitor a historical trend of vehicle behavior (e.g., which may provide useful coaching information to correct bad behaviors and implement improvements).

Figure 1D:
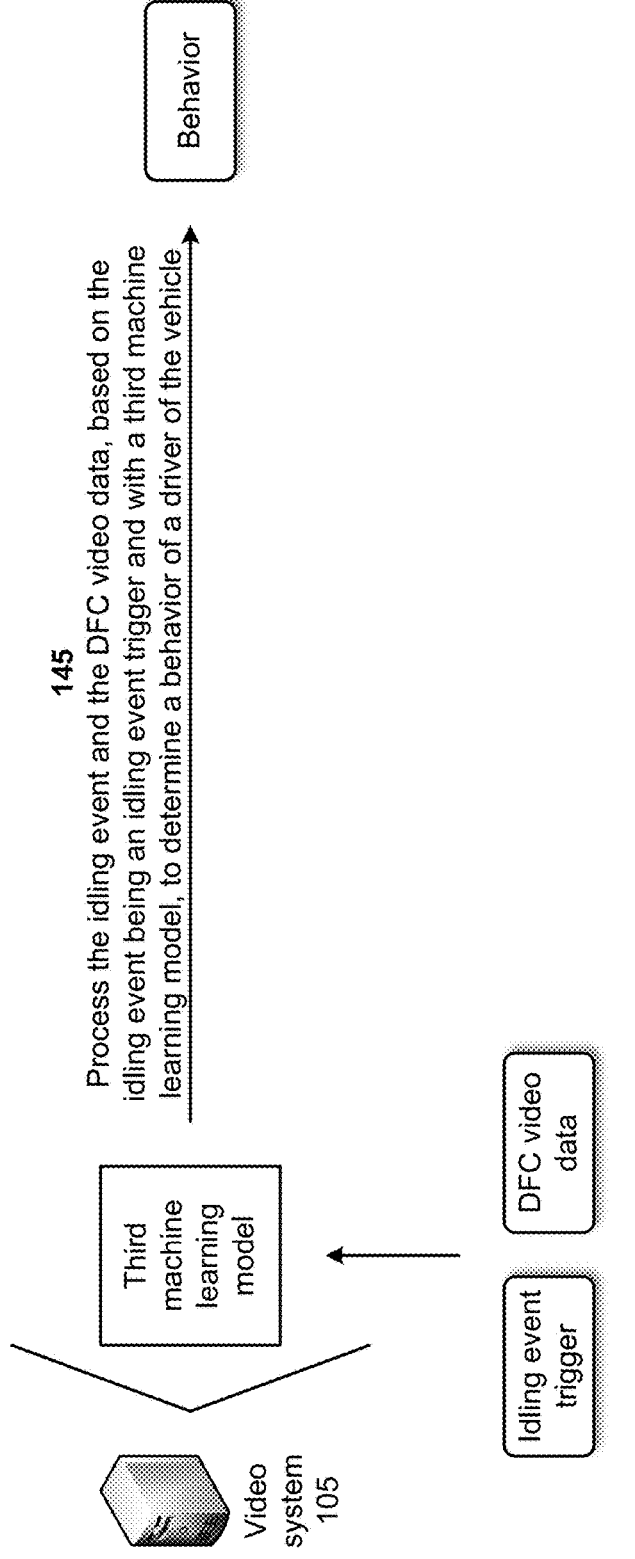

As shown in FIG. 1D, and by reference number 145, the video system 105 may process the idling event and the DFC video data, based on the idling event being an idling event trigger and with a third machine learning model, to determine a behavior of a driver of the vehicle. For example, when the video system 105 determines that the idling event is an idling event trigger and when the DFC video data is available, the video system 105 may process the idling event and the DFC video data with the third machine learning model to determine the behavior of a driver of the vehicle. In some implementations, the video system 105 may further relax the threshold value since the DFC video data provides the video system 105 with a more complete view of the vehicle's situation. The video system 105 (e.g., the third machine learning model) may determine that the driver is in the vehicle and is properly driving the vehicle. In such a scenario, the video system 105 may process the idling event, the RFC video data, and the traffic data, with the second machine learning model, to determine the second score for the idling event, as described above in connection with FIG. 1C.

Alternatively, the video system 105 (e.g., the third machine learning model) may determine that the driver is in the vehicle and has bad behavior. For example, if the vehicle is idling while the driver is not driving the vehicle (e.g., when the driver is eating, smoking, using the phone, and/or the like), the video system 105 may automatically flag the idling event as a bad idling event since the presence of the traffic is not relevant anymore. Alternatively, the video system 105 (e.g., the third machine learning model) may determine that the driver is away from the idling vehicle (e.g., a worst case scenario). Leaving the vehicle unattended with the engine running is not only a waste of money, but also may result in theft of or tampering with the vehicle or the vehicle's cargo.

Figure 1E:
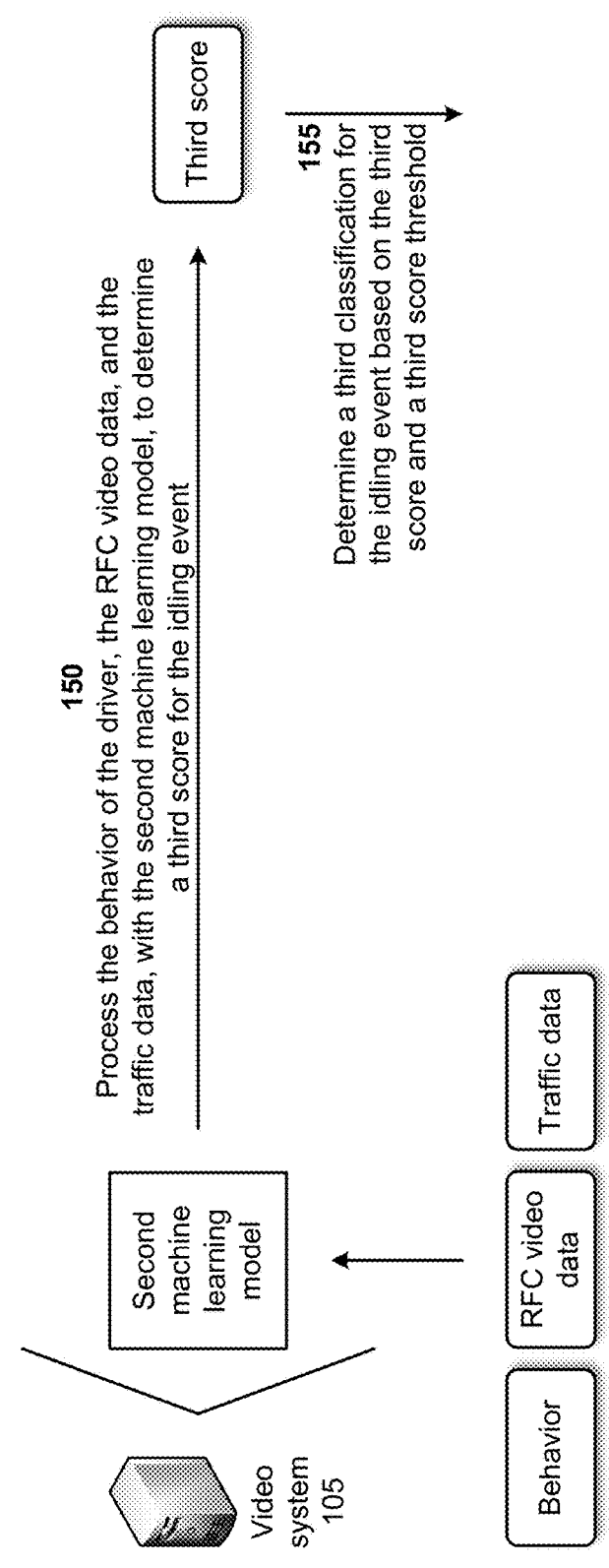

As shown in FIG. 1E, and by reference number 150, the video system 105 may process the behavior of the driver, the RFC video data, and the traffic data, with the second machine learning model, to determine a third score for the idling event. For example, after the video system 105 determines the behavior of a driver of the vehicle, the video system 105 may process the behavior of the driver, the RFC video data, and the traffic data, with the second machine learning model, to determine a third score for the idling event. The behavior of the driver and the RFC video data may improve calculation of the third score by the video system 105 since the behavior and the RFC video data provides information associated with the location of the vehicle. In some implementations, the second machine learning model may utilize the RFC video data to identify traffic lights or traffic associated with the current location of the vehicle based on presence of vehicles ahead the vehicle and movement of the vehicle (e.g., the vehicle movement may be identified from the RFC video data and/or vehicle telematics). In some implementations, the third score may be similar to the first score and the second score, but may be more precise due to additional sources of information.

Since behavior of the driver and the RFC video data provides improved traffic detection, the video system 105 may further relax the threshold value and may utilize the behavior of the driver and the RFC video data to review the idling event and to flag only true bad idling events. In some implementations, the second machine learning model may determine the third score for the idling event based on processing the behavior of the driver, the RFC video data, and the traffic data. In one example, the second machine learning model may calculate the third score (Se) for the idling event (e) as follows:

$$S_e = \Gamma * \sigma * \log_2\left(d_e - \frac{3}{4} * \delta\right) * \prod_{i=0}^{N} c_i * \prod_{j=0}^{M} b_j,$$

where $d_e$ is a duration of the idling event, $\sigma$ is a parameter that normalizes a value for a percentage score, $\delta$ is the threshold value, $\Gamma$ is an improved traffic light and/or traffic detector value (e.g., less than one if traffic is detected, one otherwise), $c_i$ is a coefficient that may influence the third score (e.g., a vehicle type, presence of start and stop system, a temperature outside the vehicle, and/or the like), and $b_j$ is a behavioral coefficient that may influence the third score (e.g., behaviors such as the driver eating, smoking, using the phone, or leaving the vehicle unattended). The coefficient $c_i$ may be a value between zero and one if it decreases the probability of bad idling (e.g., a refrigerator truck or bad weather) or greater than one if it increases the probability of bad idling (e.g., start and stop system or good weather). In some implementations, the third score may include a value between 0% and 100%.

As further shown in FIG. 1E, and by reference number 155, the video system 105 may determine a third classification for the idling event based on the third score and a third score threshold. For example, the video system 105 may determine whether the third score satisfies the third score threshold, and may determine the third classification for the idling event based on whether the third score satisfies the third score threshold. In some implementations, the third classification may indicate a "good" or "acceptable" idling event when the third score fails to satisfy the third score threshold. Alternatively, the third classification may indicate a "bad" or "unacceptable" idling event when the third score satisfies the third score threshold. In some implementations, the video system 105 may utilize the traffic data to weight the third classification (e.g., if there is traffic, the idling event may be less severe) instead of providing a deterministic third classification (e.g., acceptable or unacceptable). The third score may represent, by construction, not only a probability that the idling event is bad, but also a measure of badness for the idling event. The video system 105 may aggregate the third score of each idling event in different ways to monitor a historical trend of vehicle behavior (e.g., which may provide useful coaching information to correct bad behaviors and implement improvements).

In some implementations, the vehicles may include additional external cameras that may provide additional video data to the video system 105 and may aid in making idling event classifications. The additional video data may also indicate whether the driver is out of but near the vehicle (e.g., during a fast delivery) or if the driver is far away with the vehicle unattended (e.g., exposed to high risk). In some implementations, the video system 105 may provide, to the drivers, alerts or notifications indicating that the vehicles are idling for no good reason.

As shown in FIG. 1F, and by reference number 160, the video system 105 may perform one or more actions based on one of the first classification, the second classification, or the third classification. In some implementations, performing the one or more actions includes the video system 105 generating a notification based on the first classification, the second classification, or the third classification and providing the notification to the vehicle. For example, the video system 105 may generate, based on one of the classifications, a notification indicating that the vehicle is performing bad idling. The video system 105 may provide the notification to the vehicle and the vehicle may inform the driver of the bad idling. Alternatively, or additionally, the video system 105 may provide the notification to a phone of the driver and the phone may inform the driver of the bad idling. In this way, the video system 105 conserves computing resources, networking resources, and/or other resources that would have otherwise been consumed by creating unnecessary air pollution with vehicle idling.

In some implementations, performing the one or more actions includes the video system 105 determining a rating for the driver based on the first classification, the second classification, or the third classification. For example, the video system 105 may determine, based on one of the classifications, a rating for the driver, such as a poor rating for a bad idling event, a good rating for an acceptable idling event, and/or the like. The video system 105 may provide the driver rating to a fleet manager associated with the vehicle, the driver, and/or the like, via a fleet management system for example, and the fleet manager and/or the driver may take appropriate action based on the driver rating. In this way, the video system 105 conserves computing resources, networking resources, and/or other resources that would have otherwise been consumed by creating health issues with the unnecessary air pollution.

In some implementations, performing the one or more actions includes the video system 105 scheduling the driver for training based on the first classification, the second classification, or the third classification. For example, the video system 105 may determine, based on one of the classifications, that the driver needs training due to unacceptable idling events. The video system 105 may schedule the driver for the training, and the driver may attend the training to learn about proper idling techniques. In this way, the video system 105 conserves computing resources, networking resources, and/or other resources that would have otherwise been consumed by increasing operating costs associated with the vehicle or the fleet of vehicles.

In some implementations, performing the one or more actions includes the video system 105 causing the vehicle to be disabled based on the first classification, the second classification, or the third classification. For example, if the video system 105 determines that the vehicle is idling for an extended period of time and/or the driver is not located near the vehicle (or cannot be located), the video system 105 may determine that the vehicle should be disabled. The video system 105 may provide, to the vehicle, a command that causes the vehicle to be disabled (e.g., to prevent further wasteful idling). In this way, the video system 105 conserves computing resources, networking resources, and/or other resources that would have otherwise been consumed by creating unnecessary air pollution with vehicle idling, creating health issues with the unnecessary air pollution, increasing operating costs associated with the vehicle or the fleet of vehicles, causing damage to the vehicle or the fleet of vehicles, and/or the like.

In some implementations, performing the one or more actions includes the video system 105 retraining the first, second, and/or third machine learning models based on the first classification, the second classification, or the third classification. For example, the video system 105 may utilize the first classification, the second classification, or the third classification as additional training data for retraining the first, second, and/or third machine learning models, thereby increasing the quantity of training data available for training the first, second, and/or third machine learning models. Accordingly, the video system 105 may conserve computing resources associated with identifying, obtaining, and/or generating historical data for training the first, second, and/or third machine learning models relative to other systems for identifying, obtaining, and/or generating historical data for training machine learning models.

In this way, the video system 105 detects vehicle idling and determines classifications for the vehicle idling. For example, the video system 105 may provide a set of machine learning models that, based on available data, identify and classify vehicle idling events. The video system 105 may utilize the identification and classification of the vehicle idling events to alert drivers of unnecessary vehicle idling, to provide training to drivers associated with unnecessary idling, and/or the like. The video system 105 may utilize a first or basic machine learning model that identifies and classifies vehicle idling events based on VTU data. The video system 105 may utilize a second or enhanced machine learning model that identifies and classifies vehicle idling events based on VTU data and RFC video data. The video system 105 may utilize a third or ultimate machine learning model that identifies and classifies vehicle idling events based on VTU data, RFC video data, and DFC video data. Thus, the video system 105 may conserve computing resources, networking resources, and/or other resources that would have otherwise been consumed by creating unnecessary air pollution with vehicle idling, creating health issues with the unnecessary air pollution, increasing operating costs associated with the vehicle or the fleet of vehicles, causing damage to the vehicle or the fleet of vehicles, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
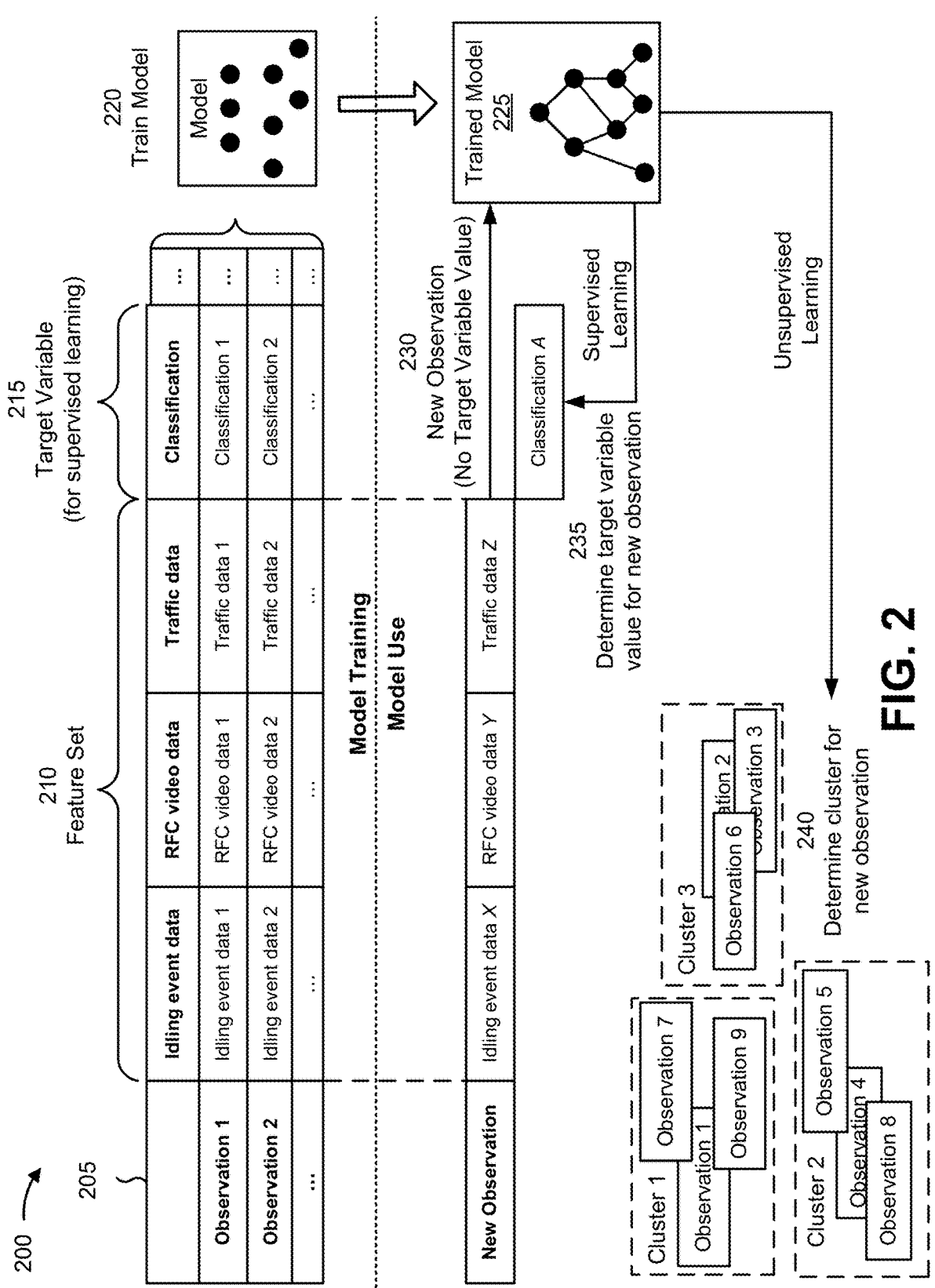
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the video system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the video system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of idling event data, a second feature of RFC video data, a third feature of traffic data, and so on. As shown, for a first observation, the first feature may have a value of idling event data 1, the second feature may have a value of RFC video data 1, the third feature may have a value of traffic data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a classification, which has a value of classification 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of idling event data X, a second feature of RFC video data Y, a third feature of traffic data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of classification A for the target variable of classification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an idling event data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an RFC video data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to detect vehicle idling and determine classifications for the vehicle idling. The machine learning system may enable recognition and/or identification of tens, hundreds, thousands, or millions of features and/or feature values for tens, hundreds, thousands, or millions of observations, thereby increasing accuracy and consistency and reducing delay associated with detecting vehicle idling and determining classifications for the vehicle idling relative to requiring computing resources to be allocated for tens, hundreds, or thousands of operators to manually detect vehicle idling and determine classifications for the vehicle idling.

As indicated above, FIG. 2 is provided as an example. Other examples may differ from what is described in connection with FIG. 2.

Figure 3:
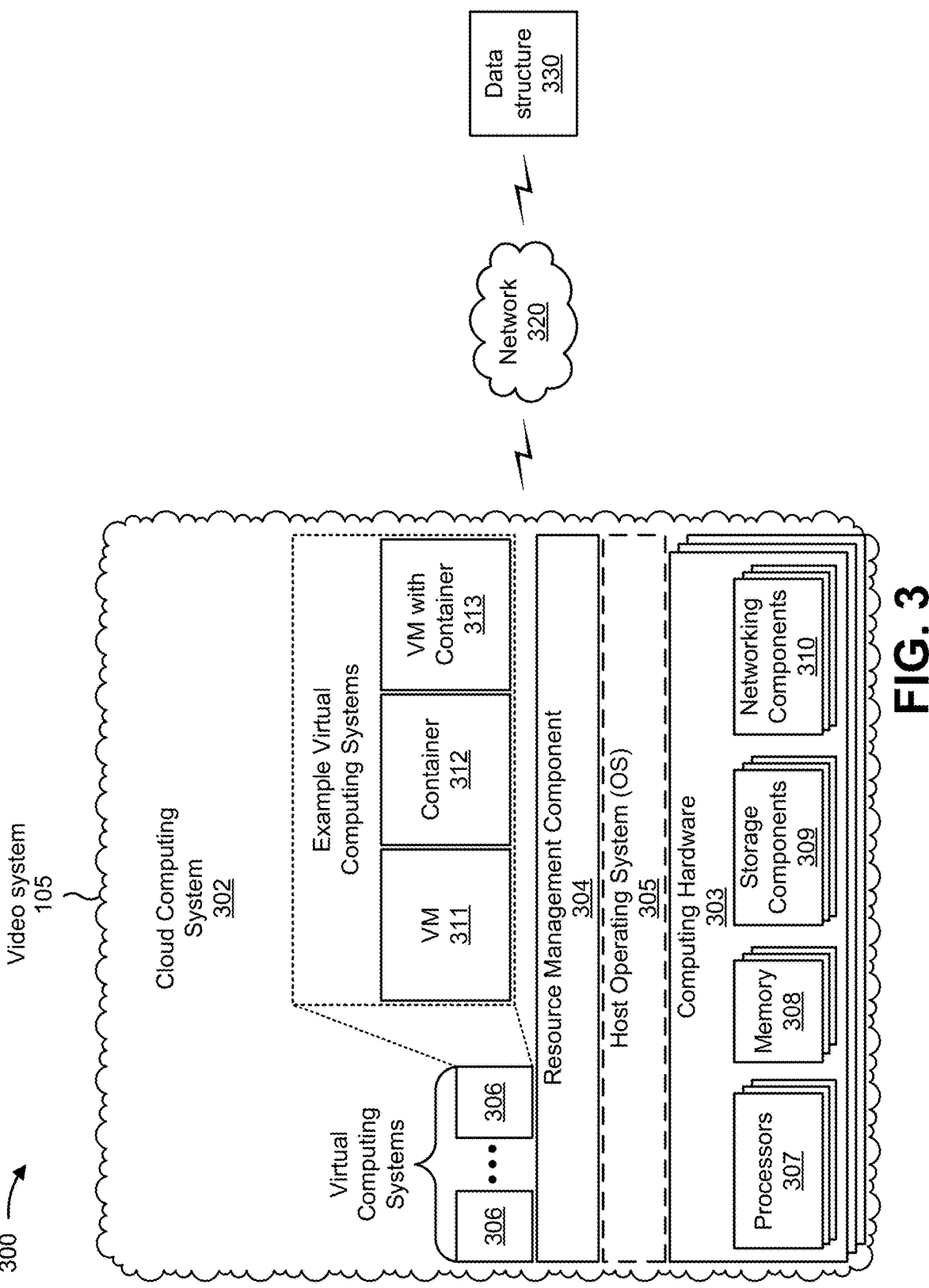
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 105 may include one or more elements 303-313 of the cloud computing system 302, may execute within the cloud computing system 302, and/or may be hosted within the cloud computing system 302, in some implementations, the video system 105 may not be cloud-based (e.g., may be implemented outside of a cloud computing system) or may be partially cloud-based. For example, the video system 105 may include one or more devices that are not part of the cloud computing system 302, such as a device 400 of FIG. 4, which may include a standalone server or another type of computing device. The video system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
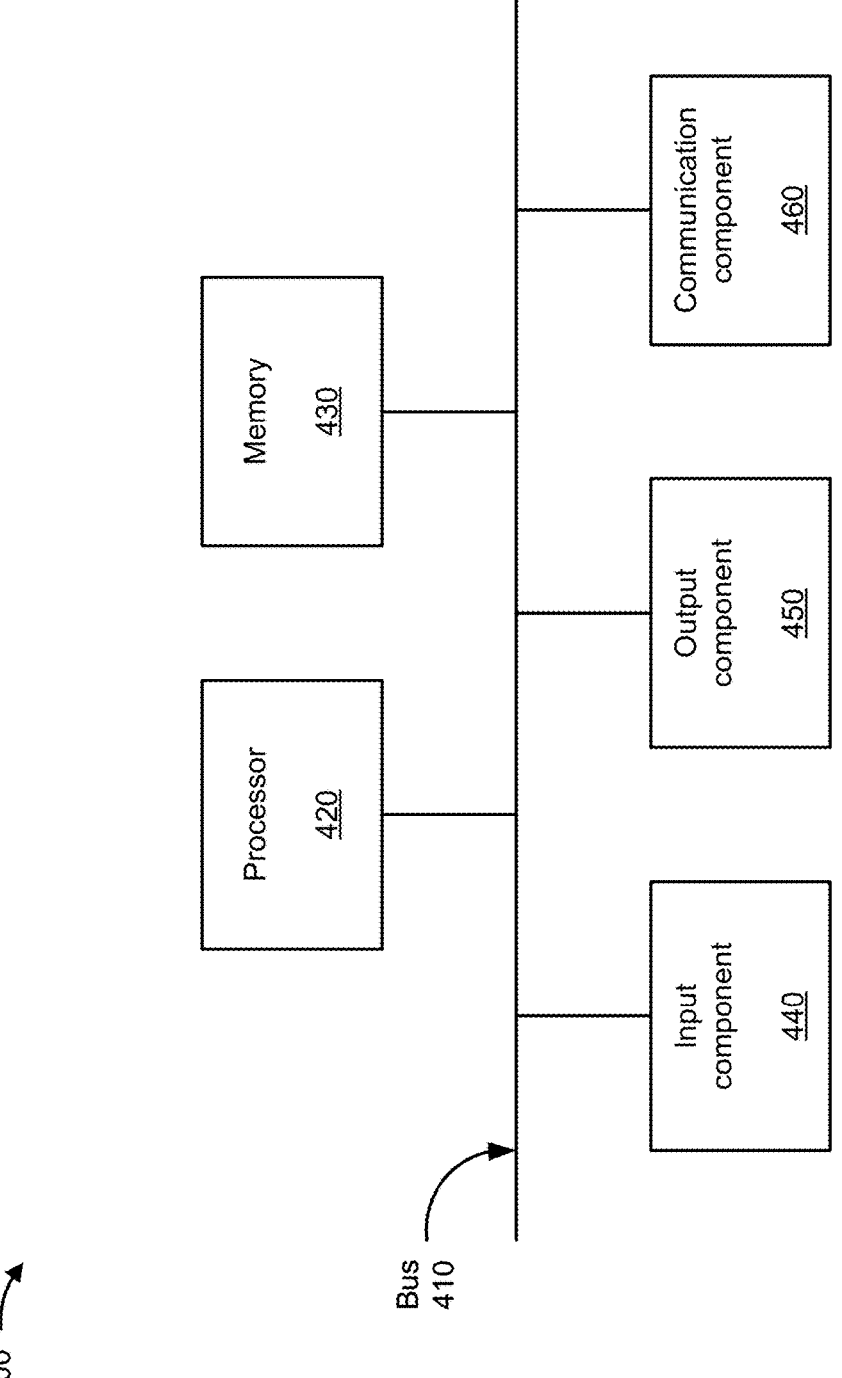
FIG. 4 is a diagram of example components of one or more devices of FIG. 3.

FIG. 4 is a diagram of example components of a device 400, which may correspond to the video system 105 and/or the data structure 330. In some implementations, the video system 105 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for detecting vehicle idling and determining classifications for the vehicle idling. In some implementations, one or more process blocks of FIG. 5 may be performed by a device (e.g., the video system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving idling events data associated with a vehicle (block 510). For example, the device may receive idling events data associated with a vehicle, as described above. In some implementations, the idling events data associated with the vehicle is generated by a vehicle tracking system of the vehicle.

As further shown in FIG. 5, process 500 may include receiving traffic data associated with the vehicle (block 520). For example, the device may receive traffic data associated with the vehicle, as described above.

As further shown in FIG. 5, process 500 may include determining that an idling event of the idling events data is an idling event trigger (block 530). For example, the device may determine that an idling event of the idling events data is an idling event trigger, as described above.

As further shown in FIG. 5, process 500 may include processing the idling event and the traffic data, with a machine learning model and based on the idling event being an idling event trigger, to determine a score for the idling event (block 540). For example, the device may process the idling event and the traffic data, based on the idling event being an idling event trigger and with a machine learning model, to determine a score for the idling event, as described above.

As further shown in FIG. 5, process 500 may include determining a classification for the idling event based on the score and a score threshold (block 550). For example, the device may determine a classification for the idling event based on the score and a score threshold, as described above. In some implementations, the classification provides an indication of whether the idling event is an acceptable idling event relative to the score threshold. In some implementations, determining the classification for the idling event based on the score and the score threshold includes determining whether the score satisfies the score threshold, and determining the classification for the idling event based on whether the score satisfies the score threshold.

As further shown in FIG. 5, process 500 may include performing one or more actions based on the classification (block 560). For example, the device may perform one or more actions based on the classification, as described above. In some implementations, performing the one or more actions includes generating a notification based on the classification, and providing the notification to the vehicle. In some implementations, performing the one or more actions includes one or more of determining a rating for a driver of the vehicle based on the classification, or scheduling the driver of the vehicle for training based on the classification. In some implementations, performing the one or more actions includes one or more of causing the vehicle to be disabled based on the classification, or retraining the machine learning model based on the classification.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 depicts a flowchart of an example process 600 for detecting vehicle idling and determining classifications for the vehicle idling. In some implementations, one or more process blocks of FIG. 6 may be performed by a device (e.g., the video system 105). In some implementations, one or more process blocks of FIG. 6 may be performed by another device or a group of devices separate from or including the device. Additionally, or alternatively, one or more process blocks of FIG. 6 may be performed by one or more components of the device 400, such as the processor 420, the memory 430, the input component 440, the output component 450, and/or the communication component 460.

As shown in FIG. 6, process 600 may include receiving RFC video data and idling events data associated with a vehicle (block 610). For example, the device may receive RFC video data and idling events data associated with a vehicle, as described above.

As further shown in FIG. 6, process 600 may include receiving traffic data associated with the vehicle (block 620). For example, the device may receive traffic data associated with the vehicle, as described above.

As further shown in FIG. 6, process 600 may include determining that an idling event of the idling events data is an idling event trigger (block 630). For example, the device may determine that an idling event of the idling events data is an idling event trigger, as described above.

As further shown in FIG. 6, process 600 may include processing the idling event, the RFC video data, and the traffic data, based on the idling event being an idling event trigger and with a machine learning model, to determine a score for the idling event (block 640). For example, the device may process the idling event, the RFC video data, and the traffic data, based on the idling event being an idling event trigger and with a machine learning model, to determine a score for the idling event, as described above.

As further shown in FIG. 6, process 600 may include determining a classification for the idling event based on the score and a score threshold (block 650). For example, the device may determine a classification for the idling event based on the score and a score threshold, as described above. In some implementations, the classification provides an indication of whether the idling event is an acceptable idling event relative to the score threshold. In some implementations, determining the classification for the idling event based on the score and the score threshold includes determining whether the score satisfies the score threshold, and determining the classification for the idling event based on whether the score satisfies the score threshold.

As further shown in FIG. 6, process 600 may include performing one or more actions based on the classification (block 660). For example, the device may perform one or more actions based on the classification, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 depicts a flowchart of an example process 700 for detecting vehicle idling and determining classifications for the vehicle idling. In some implementations, one or more process blocks of FIG. 7 may be performed by a device (e.g., the video system 105). In some implementations, one or more process blocks of FIG. 7 may be performed by another device or a group of devices separate from or including the device. Additionally, or alternatively, one or more process blocks of FIG. 7 may be performed by one or more components of the device 400, such as the processor 420, the memory 430, the input component 440, the output component 450, and/or the communication component 460.

As shown in FIG. 7, process 700 may include receiving vehicle data associated with a vehicle (block 710). For example, the device may receive RFC video data, DFC video data, idling events data, and traffic data associated with a vehicle, as described above.

As further shown in FIG. 7, process 700 may include determining that an idling event of the idling events data is an idling event trigger (block 720). For example, the device may determine that an idling event of the idling events data is an idling event trigger, as described above.

As further shown in FIG. 7, process 700 may include processing the idling event and the DFC video data, based on the idling event being an idling event trigger and with a first machine learning model, to determine a behavior of a driver of the vehicle (block 730). For example, the device may process the idling event and the DFC video data, based on the idling event being an idling event trigger and with a first machine learning model, to determine a behavior of a driver of the vehicle, as described above. In some implementations, the behavior of the driver includes one of the driver being located in the vehicle and the vehicle is moving, the driver being located in the vehicle and the vehicle is not moving, or the driver not being located in the vehicle.

As further shown in FIG. 7, process 700 may include processing the behavior of the driver, the RFC video data, and the traffic data, with a second machine learning model, to determine a score for the idling event (block 740). For example, the device may process the behavior of the driver, the RFC video data, and the traffic data, with a second machine learning model, to determine a score for the idling event, as described above.

As further shown in FIG. 7, process 700 may include determining a classification for the idling event based on the score and a score threshold (block 750). For example, the device may determine a classification for the idling event based on the score and a score threshold, as described above.

As further shown in FIG. 7, process 700 may include performing one or more actions based on the classification (block 760). For example, the device may perform one or more actions based on the classification, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, idling events data associated with a vehicle;
   receiving, by the device, traffic data associated with the vehicle,
   wherein the traffic data is received from a source external to the vehicle, and
   wherein the traffic data and the idling events data are received from different sources;
   determining, by the device, that an idling event of the idling events data is an idling event trigger;
   processing, by the device, based on the idling event being an idling event trigger, and with a first machine learning model, the idling events data and the traffic data, to determine a first score for the idling event, based on determining that video data is not available,
   wherein the video data is associated with a vehicle device;
   processing, by the device, the idling events data, the video data, and the traffic data, with a machine learning model and based on the idling event being an idling event trigger, to determine a second score for the idling event, based on determining that the video data is available;
   determining, by the device, a classification for the idling event based on the first score or the second score, and a score threshold; and
   performing, by the device, one or more actions based on the classification.

2. The method of claim 1, wherein the classification provides an indication of whether the idling event is an acceptable idling event relative to the score threshold.

3. The method of claim 1, wherein determining the classification for the idling event based on the first score or the second score, and the score threshold comprises:
   determining whether the first score or the second score satisfies the score threshold; and
   determining the classification for the idling event based on whether the first score or the second score satisfies the score threshold.

4. The method of claim 1, wherein performing the one or more actions comprises:
   generating a notification based on the classification; and
   providing the notification to the vehicle.

5. The method of claim 1, wherein performing the one or more actions comprises one or more of:
   determining a rating for a driver of the vehicle based on the classification; or
   scheduling the driver of the vehicle for training based on the classification.

6. The method of claim 1, wherein performing the one or more actions comprises one or more of:
   causing the vehicle to be disabled based on the classification; or
   retraining the machine learning model based on the classification.

7. The method of claim 1, wherein the idling events data associated with the vehicle is generated by a vehicle tracking system of the vehicle.

8. A device, comprising:
   one or more processors configured to:
   receive road facing camera (RFC) video data and idling events data associated with a vehicle;
   receive traffic data associated with the vehicle,
   wherein the traffic data is received from a source external to the vehicle, and
   wherein the traffic data and the idling events data are received from different sources;
   determine that an idling event of the idling events data is an idling event trigger;
   selectively perform:
   processing the idling events data and the traffic data, based on the idling event being an idling event trigger and with a first machine learning model, to determine a first score for the idling event, based on determining that the RFC video data is not available, or
   processing the idling events data, the RFC video data, and the traffic data, based on the idling event being an idling event trigger and with a machine learning model, to determine a second score for the idling event, based on determining that the RFC video data is available;

determine a classification for the idling event based on the first score or the second score, and a score threshold; and perform one or more actions based on the classification.

9. The device of claim 8, wherein the classification provides an indication of whether the idling event is an acceptable idling event relative to the score threshold.

10. The device of claim 8, wherein the one or more processors, to determine the classification for the idling event based on the first score or the second score, and the score threshold, are configured to:

determine whether the first score or the second score satisfies the score threshold; and determine the classification for the idling event based on whether the first score or the second score satisfies the score threshold.

11. The device of claim 8, wherein the one or more processors, to perform the one or more actions, are configured to:

generate a notification based on the classification; and provide the notification to the vehicle.

12. The device of claim 8, wherein the one or more processors, to perform the one or more actions, are configured to one or more of:

determine a rating for a driver of the vehicle based on the classification; or schedule the driver of the vehicle for training based on the classification.

13. The device of claim 8, wherein the one or more processors, to perform the one or more actions, are configured to one or more of:

cause the vehicle to be disabled based on the classification; or retrain the machine learning model based on the classification.

14. The device of claim 8, wherein the idling events data associated with the vehicle is generated by a vehicle tracking system of the vehicle.

15. A non-transitory computer-readable medium storing a set of instructions, the set of instructions comprising:

one or more instructions that, when executed by one or more processors of a device, cause the device to:

receive road facing camera (RFC) video data, driver facing camera (DFC) video data, and idling events data associated with a vehicle;

receive traffic data associated with the vehicle, wherein the traffic data is received from a source external to the vehicle, and wherein the traffic data and the idling events data are received from different sources;

determine that an idling event of the idling events data is an idling event trigger;

selectively perform:

processing the idling events data and the traffic data, based on the idling event being an idling event trigger and with a first machine learning model, to determine a first score for the idling event, based on determining that the RFC video data and the DFC video data are not available, performing, based on determining that the RFC video data and the DFC video data are available:

processing the idling events data and the DFC video data, based on the idling event being an idling event trigger and with a first machine learning model, to determine a behavior of a driver of the vehicle; and processing the behavior of the driver, the RFC video data, and the traffic data, with a second machine learning model, to determine a second core for the idling event;

determine a classification for the idling event based on the first score or the second score, and a score threshold; and perform one or more actions based on the classification.

16. The non-transitory computer-readable medium of claim 15, wherein the behavior of the driver includes one of the driver being located in the vehicle and the vehicle is moving, the driver being located in the vehicle and the vehicle is not moving, or the driver not being located in the vehicle.

17. The non-transitory computer-readable medium of claim 15, wherein the one or more instructions, that cause the device to determine the classification for the idling event based on the first score or the second score and the score threshold, cause the device to:

determine whether the first score or the second score satisfies the score threshold; and determine the classification for the idling event based on whether the first score or the second score satisfies the score threshold.

18. The non-transitory computer-readable medium of claim 15, wherein the one or more instructions, that cause the device to perform the one or more actions, cause the device to:

generate a notification based on the classification; and provide the notification to the vehicle.

19. The non-transitory computer-readable medium of claim 15, wherein the one or more instructions, that cause the device to perform the one or more actions, cause the device to one or more of:

determine a rating for a driver of the vehicle based on the classification; or schedule the driver of the vehicle for training based on the classification.

20. The non-transitory computer-readable medium of claim 15, wherein the one or more instructions, that cause the device to perform the one or more actions, cause the device to one or more of:

cause the vehicle to be disabled based on the classification; or retrain the first machine learning model and the second machine learning model based on the classification.

* * * * *